June 25, 1929. J. E. DWYER 1,718,279
DRILL HOLDER FOR LATHE TAILSTOCKS
Filed Feb. 25, 1927
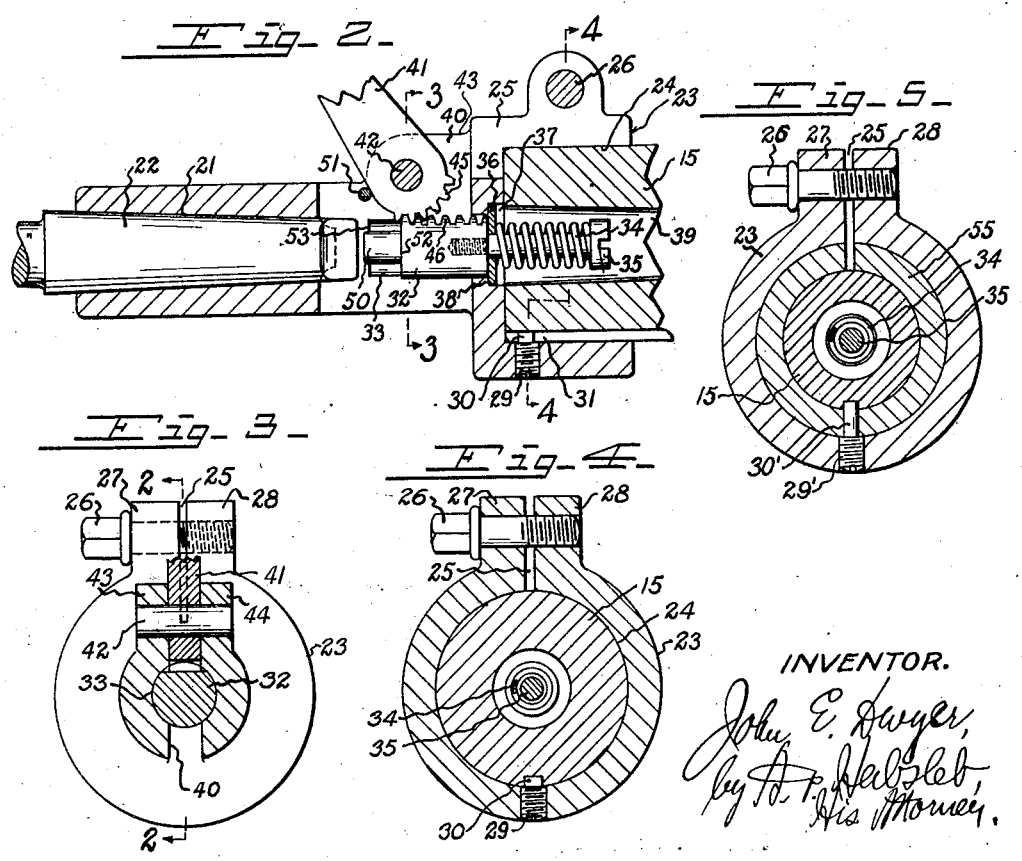
INVENTOR.
John E. Dwyer,
by his Attorney.

Patented June 25, 1929.

1,718,279

UNITED STATES PATENT OFFICE.

JOHN E. DWYER, OF CINCINNATI, OHIO.

DRILL HOLDER FOR LATHE TAILSTOCKS.

Application filed February 25, 1927. Serial No. 170,805.

My invention relates to a drill holder arranged to be attached to the tail spindle of a lathe, and has for its object the provision of novel means to eject the drill from the holder; further, to provide the holder with novel means to securely position the holder in relation to the tail spindle; and, further, to provide novel means for attaching the holder to tail spindles of various sizes.

The invention will be further readily understood from the following description and claims, and from the drawing, in which latter:

Fig. 1 is a side elevation of a lathe, partly broken away, with the invention applied thereto.

Fig. 2 is a longitudinal section of the device, taken in the plane of the line 2—2 of Fig. 3, and partly broken away.

Fig. 3 is a cross-section of the same, taken in the plane of the line 3—3 of Fig. 2.

Fig. 4 is a cross-section of the same, taken in the plane of the irregular line 4—4 of Fig. 2; and, Fig. 5 is a modification of the same, shown in cross-section similar to Fig. 4.

Mounted on the bed 12 of a lathe 13 is the usual tail stock 14. The tail stock has a usual tail spindle 15, non-rotatably mounted in the tail stock. Endwise movements in opposite directions are imparted to the spindle by a handwheel 16 in usual manner.

The improved device is an attachment which is secured to this spindle, and is for the purpose of enabling drilling operations to be performed on a lathe, the drill however being stationary and the work rotating. The rotation of the work is caused by its attachment to the usual rotatable head spindle, quill or face-plate of the lathe in usual manner.

The device is provided with a taper bore 21, in which the tapered shank 22 of a usual cutting tool 20, shown as a drill, is received. The other end of the holder is provided with a clamp bearing 23, having a bore 24, which is received over the end of the tail spindle. The clamp bearing has a longitudinal slot 25 therein, for permitting the bolt 26, which is received in lugs 27, 28, and has threaded connection with the latter to firmly clamp the holder to the tail spindle. Rotation between the attachment and the tail spindle is additionally prevented, as by means of a screw 29 threaded into the bearing, and having a reduced end 30 received in a key-way 31 in the spindle.

A knock-out plug 32 is received in a bore 33, between the taper bore and the clamp bearing. A spring 34 surrounds a bolt 35, which is threaded into the plug. The spring is received between the head of the bolt and a washer 36. The washer 36 is received in a recess 37 and bears against the shoulder 38. The bolt and the spring extend into the usual taper socket 39 in the tail spindle.

The device is provided with a slot 40 adjacent the plug. One end of a handle 41 projects into the slot and is pivoted on a pin 42 journaled in lugs 43, 44. A gear segment 45 on the end of said handle meshes with teeth 46 on the plug. One end of the plug is provided with a reduced end 50 which acts on the end of the drill for forcing the drill out of the socket. The outer end of the plug is normally spaced from the inner end of the drill when the plug is in retracted or normal position and the drill is in the socket. (See Fig. 2.)

The handle is normally in the position shown in Figs. 1 and 2, being retained in such position by the action of the spring and by the weight of the handle. The spring urges the handle into up-position. A pin 51 prevents overthrow of the handle. This pin is received across the slot 40, being received in holes in the walls of said slot. The bore 33 is continued as guiding recesses in the walls of said slot. The reduced end 50 of the plug 32 is movable in said slot.

When it is desired to remove the drill, the handle 41 is pressed downwardly, causing the meshing teeth to move the plug forward. The outer end of the reduced portion of the plug moves through said space between the outer end of the plug and the inner end of the drill when the drill is in the socket and strikes the end of the drill a hammering blow and forces it outward, freeing the drill from the tapered socket 21. The plug is limited in its outward movement by the shoulder 52 on the plug engaging the end wall 53 of the bore 33.

In the form shown in Fig. 5, a split bushing 55 is inserted between the clamp bearing and the spindle in cases where the spindle is of smaller diameter than the bore of the clamp bearing. Bushings with various sizes of bores may be provided, thereby permitting the device to be attached to any size lathe spindle. The reduced end 30' of the screw 29' extends through a hole in the bushing 55 into the key-way 31.

My improved device provides a rigid holder for the drill, and provides means for rigidly attaching the holder to the tail spindle in such manner that twisting or endwise pulling of the drill in the work away from the tail spindle cannot affect the firmness of such attachment, my improved device effectively resisting all strains upon the drill.

In my improved device the handle is conveniently located in definite position, and the drill is ejected by downward pressure or a downward blow upon the handle, producing a hammering blow by the plug upon the drill, especially when the outer end of the plug first moves through the space between it and the inner end of the drill before striking the drill, whereby great force can be exerted by the operator for release of the drill. The handle is, upon release, automatically returned to its normal position. The knock-out plug is normally out of the way of the drill, that is, spaced from the drill, so that no interference is encountered in inserting the drill. The attachment is easily and readily applied, and is strong and durable. It is also of such structure and arrangement that no contact is made with the wall of the socket for the tail center so that said wall is maintained in accurate condition for accurate functioning of the tail center and other precision tools as may be received therein.

Having thus fully described my invention what I claim as new, and desire to secure by Letters Patent, is:

1. A tool-holder arranged for attachment to a lathe-spindle, said tool-holder provided with an axially tapered socket for receiving the tapered end of a tool, an axially movable knock-out plug in line with said socket, the outer end of said knock-out plug when in normal position being spaced axially from the inner end of said tool when said tool is in said socket, a lever having operative connection with said knock-out plug and movable from normal position for axially moving said knock-out plug and moving said outer end of said knockout plug through said space and thereby striking said tool a hammering blow for ejecting the tool from said socket, and a spring for automatically returning said handle and said knock-out plug to said normal positions.

2. A tool-holder arranged for attachment to a lathe-spindle having an axial socket, said tool-holder provided with an axially tapered socket for receiving the tapered end of a tool, an axially movable knock-out plug in line with said sockets and normally spaced from the tool in said second-named socket, a lever having operative connection with said knock-out plug and movable from normal position for axially moving said knock-out plug and moving the end of said knock-out plug past said space and ejecting the tool from said second-named socket, and a spring for automatically moving said knock-out plug away from said tool and automatically returning said handle to normal position, said spring extending into said first-named socket.

3. A tool-holder comprising a clamp-bearing arranged to be received about the end of a lathe-spindle said lathe-spindle having an axial socket, said tool-holder provided with an axially tapered socket for receiving the tapered end of a tool, an axially movable kock-out plug in line with said sockets and normally spaced from the tool in said second-named socket, a lever having operative connection with said knock-out plug and movable from normal position for axially moving said knock-out plug and moving the end of said knock-out plug past said space and ejecting the tool from said second-named socket, and a spring encircling the inner end of said knock-out plug for automatically moving said knock-out plug away from said tool and automatically returning said handle to normal position, said spring and said inner end of said knock-out plug located inside said clamp-bearing and received in said first-named socket.

In testimony whereof, I have hereunto signed my name.

JOHN E. DWYER.